United States Patent [19]

Harden

[11] 4,371,148

[45] Feb. 1, 1983

[54] PIVOTAL CONNECTION FOR ENCLOSURE SECTIONS

[76] Inventor: Richard L. Harden, R.R. 1, Lineville, Iowa 50147

[21] Appl. No.: 216,205

[22] Filed: Dec. 15, 1980

Related U.S. Application Data

[60] Division of Ser. No. 118,912, Feb. 6, 1980, abandoned, which is a continuation-in-part of Ser. No. 845,872, Oct. 27, 1977, Pat. No. 4,193,378, which is a continuation of Ser. No. 709,862, Jul. 29, 1976, Pat. No. 4,089,301.

[51] Int. Cl.³ ............................................. E04H 17/16
[52] U.S. Cl. ....................................... 256/26; 256/25; 256/73; 160/135; 160/351
[58] Field of Search ....................... 256/24, 25, 26, 73; 119/20, 60; 16/147, 163; 160/135, 351

[56] References Cited

U.S. PATENT DOCUMENTS

| | | | |
|---|---|---|---|
| 1,449,587 | 3/1923 | Colvin | 256/73 |
| 3,788,378 | 1/1974 | Sobel | 160/135 |
| 3,815,877 | 6/1974 | Turner | 256/25 X |
| 3,910,560 | 10/1975 | Goetz | 256/25 X |

Primary Examiner—James Kee Chi
Attorney, Agent, or Firm—Zarley, McKee, Thomte, Voorhees & Sease

[57] ABSTRACT

A hay enclosure includes two end sections and two sections along each side. Diagonally opposite side sections are equal in length, although the two sections on each side have different lengths. The enclosure is pivotally movable to a second position wherein two triangular-in-shape enclosures are formed having an area smaller than the rectangular enclosure area. A circular enclosure includes four arcuate sections which may be collapsed about a bale of hay into two pillow-shaped enclosures. Adjacent sections are pivotally interconnected by vertically spaced apart hinges, with the upper hinge including a downwardly extending pin received in a sleeve, and the lower hinge including a pair of abutting vertically aligned sleeves in which a movable pin is received.

A horse hay feeder section includes inverted spaced apart U-shaped spacers providing horse head feeding stations therebetween and being open at the top whereby a horse may raise its head and turn it away over one of the adjacent spacers.

2 Claims, 17 Drawing Figures

U.S. Patent  Feb. 1, 1983  Sheet 1 of 2  4,371,148
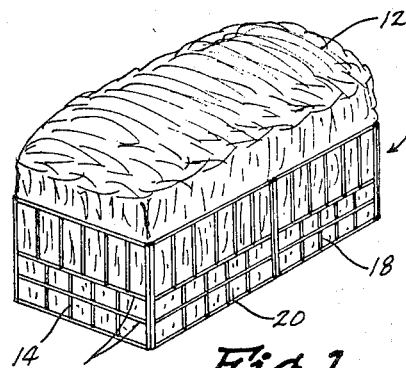
Fig. 1
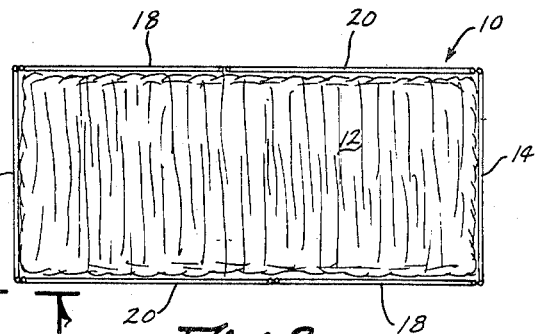
Fig. 2
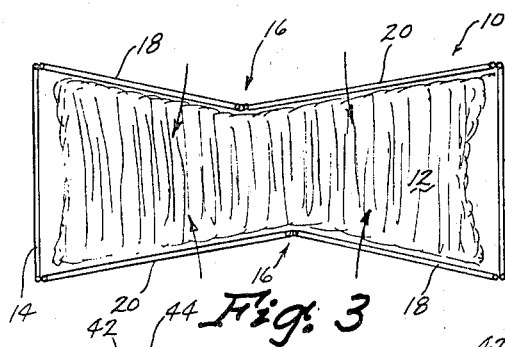
Fig. 3
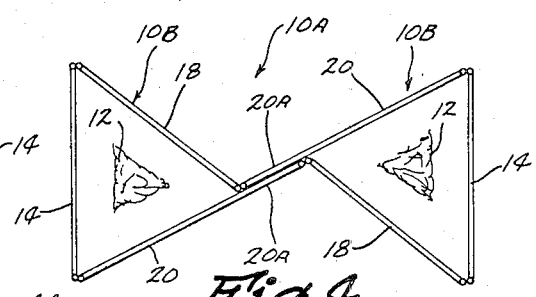
Fig. 4
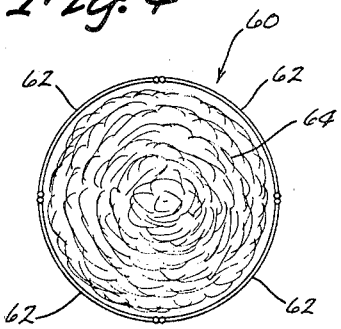
Fig. 7
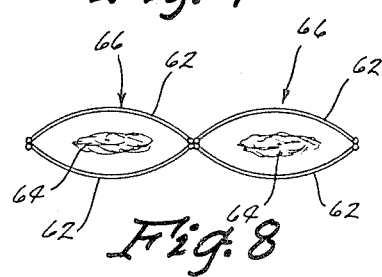
Fig. 8
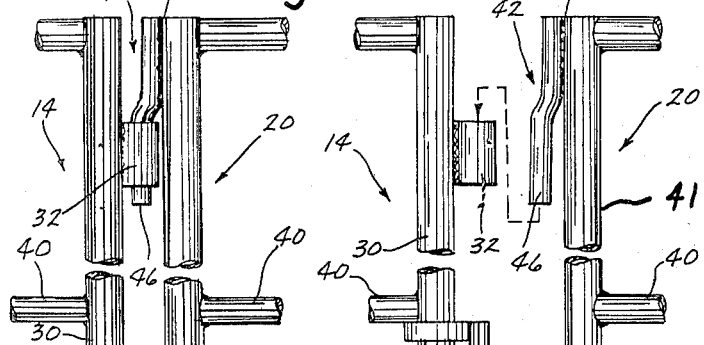
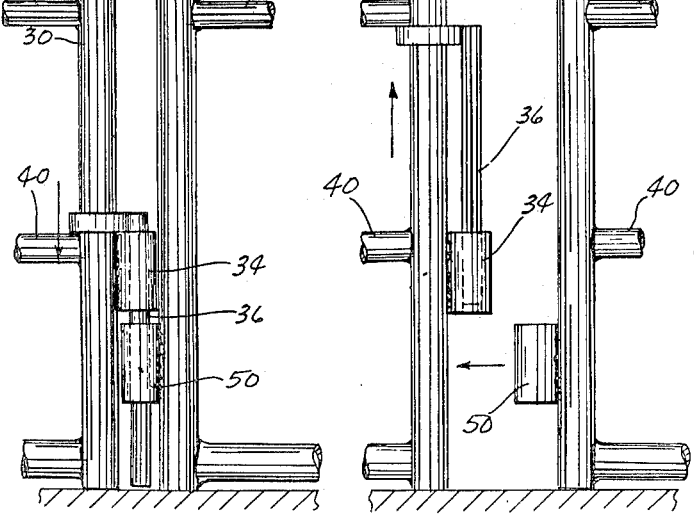
Fig. 6  Fig. 5

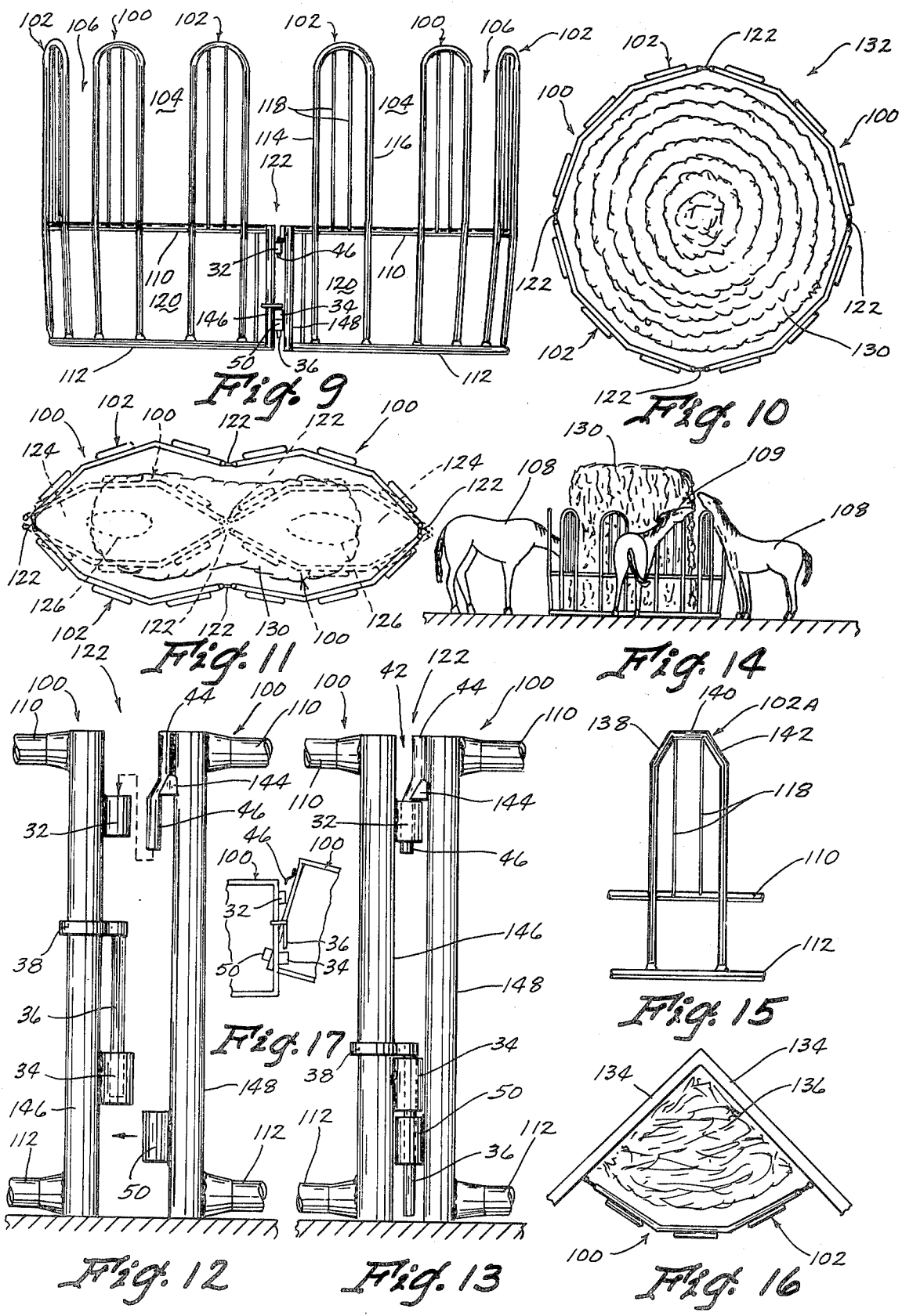

PIVOTAL CONNECTION FOR ENCLOSURE SECTIONS

This application is a division of application Ser. No. 118,912, filed Feb. 6, 1980, now abandoned, which is a continuation-in-part of Ser. No. 845,872, filed Oct. 27, 1977, now U.S. Pat. No. 4,193,378 which is a continuation of Ser. No. 709,862, filed July 29, 1976, now U.S. Pat. No. 4,089,301.

BACKGROUND OF THE INVENTION

A haystack and bale feeder enclosure is desired that will accommodate a full-size stack initially but will adjust in its shape as the stack is consumed by animals feeding through the side walls of the enclosure. The adjustment in the shape of the enclosure must give the animals continuous access to the remaining stack, all the while maintaining standing stability. A hinge connection between pivotally interconnected sections is necessary that will not become accidentally disengaged through rough handling by cattle feeding at the feeder enclosure.

The feeding of horses requires different feed openings at the feeding stations since the horse when it stops feeding raises its head and then turns its head out of the feeding station rather than backing away from feeder before raising its head. Conventional cattle feeders would injure the horse since the feeding openings have top cross pieces on which the horse would hit its head as it is being raised and the horse could not turn its head before withdrawing from the feeder.

SUMMARY OF THE INVENTION

The hay feeder enclosure of this invention includes two embodiments. The first embodiment includes six pivotally interconnected sections movable between a rectangular shape in a first position, to a second position forming two triangles. The total area of the two triangles in the second position is less than the area in the rectangular first position due to the fact that diagonally opposite sections overlap in the second position because the two sides of the enclosure in the first rectangular position include sections which are of unequal length. The short sections are diagonally opposite each other as are the long sections and when the sections are moved to the second position, forming the two triangles, the long sections are in closely adjacent parallel planes, while the short sections are in spaced-apart parallel planes.

The second embodiment of the hay feeding enclosure includes four arcuate sections pivotally interconnected to form a circular enclosure in a first position and pivotally movable to a second position forming two pillow-shaped enclosures. Due to the fact that the sections are arcuate, the midsections of opposite sides of the pillow-shaped enclosures are spaced apart, thereby providing standing stability to the structure which would otherwise be easily pushed over by animals feeding through the enclosure openings.

The adjacent sections are pivotally interconnected by two hinges. An upper hinge includes a rigid downwardly extending pin on one section received in a sleeve on the other section. The lower hinge includes a sleeve on one section vertically aligned with a sleeve on the other section, and a vertically movable pin extends through the aligned sleeves. A stop on the other section limits upward travel of the pin to maintain it in the sleeve on the other section.

In assembling the adjacent sections, the lower end of the one section is swung laterally out of alignment with the other section to allow the one section to move upwardly for the rigid pin to register with the sleeve on the other section. One section is then moved downwardly until clearance is provided between the lower sleeves such that the one section can move laterally into alignment with the other section, whereupon the movable pin is moved into its locking position.

An alternate embodiment of the feeder is for feeding horses and includes an enclosure section including spaced apart inverted U-shaped members providing horse feeding stations therebetween and being open at the top whereby the horse may raise its head and turn away over one of the adjacent spacer members without causing injury to itself. Bars are provided between the legs to prevent the horse from sticking its head therebetween and the space between the legs of the lower end is open to allow the horse's legs to freely move about without being caught on bars or the like. The fabrication of the horse feeder section includes the forming of a recess in the upper legs of tube material for engagement with the upper horizontal member of two spaced apart horizontally disposed tube members. The lower tube member is welded to the lower ends of the legs which are flattened on both sides and connect at the top of the tube member at its center.

DESCRIPTION OF THE DRAWINGS

FIG. 1 is a perspective view of a rectangular hay feeding enclosure embracing a stack of hay.

FIG. 2 is a top plan view thereof.

FIG. 3 is a view similar to FIG. 2 illustrating the sides being collapsed towards each other as the hay is consumed.

FIG. 4 is a view similar to FIGS. 2 and 3 but showing the rectangular enclosure having been collapsed to a pair of triangular enclosures.

FIG. 5 is a view of adjacent end sections prior to being interconnected.

FIG. 6 is a view similar to FIG. 5 taken along line 6—6 in FIG. 2, illustrating the end sections being interconnected.

FIG. 7 is a top plan view of an alternate embodiment of this invention.

FIG. 8 is a top plan view similar to FIG. 7 showing the enclosure in its collapsed condition forming two pillow-shaped enclosures.

FIG. 9 is a side elevational view of an alternate embodiment of a horse hay feeding enclosure.

FIG. 10 is a top plan view of a circular horse hay feeding enclosure.

FIG. 11 is a top plan view of the feeder after a quantity of the hay has been eaten and the feeder has been elongated by the horses to form two hay enclosures.

FIG. 12 is a fragmentary view of adjacent end sections prior to being interconnected.

FIG. 13 is a view of adjacent end sections after being interconnected.

FIG. 14 is a reduced in scale side elevational view of horses feeding at the hay enclosure.

FIG. 15 is a fragmentary side elevational view of a further alternate embodiment of the horse hay feeding enclosure sections showing the inverted V-shaped spacer member being formed of straight portions.

FIG. 16 is a top plan view of a horse hay feeding enclosure section extending between corner walls.

FIG. 17 is a reduced in scale side elevational view of one end of one section being raised and overlapping along its lower end, while the upper pin is placed in the sleeve on the other section.

DESCRIPTION OF THE PREFERRED EMBODIMENT

The hay feeder enclosure of FIG. 1 is referred to generally by the reference numeral 10 and encloses a loaf-type haystack 12.

Enclosure 10 is rectangular in shape and includes a pair of oppositely disposed end sections 14 and opposite sides 16 comprising a pair of unequal-in-length sections 18 and 20. The short sections 18 are diagonally opposite each other as are the longer sections 20 in the two sides 16.

In FIG. 4 the rectangular enclosure 10 has been contracted into an enclosure 10A, including a pair of triangular enclosures 10B, having a total area less than the rectangular enclosure 10 due to the fact that the longer side sections 20 overlap each other along portions 20A. The section lengths may vary as long as the two side sections are of unequal length when forming the rectangular-shaped enclosure 10. As previously indicated, the longer sections 20 should be diagonally opposite as are the shorter sections 18 so that the longer sections will have overlapping end portions 20A when in the second position forming enclosure 10A. A typical size for the sections would be 9 feet for the end sections 14, 8 feet for the longer sections 20 and 7 feet for the shorter sections 18. This size enclosure will accommodate one large loaf-type haystack 12, two small stacks, or two 3,000 pound bales. Variations in the size of the various sections will allow the enclosure to suitably handle additional bales. For example, three 1,500 pound bales can be accommodated by moving the short 7-foot side section 18 to the end of the enclosure and moving the 9-foot end section 14 to the side of the enclosure.

The adjacent end sections are interconnected in a similar fashion as sections 14 and 20, illustrated in FIGS. 5 and 6. Section 14 includes a vertical end post 30 having an upper sleeve 32 and a lower guide sleeve 34. The guide sleeve 34 receives a vertically movable pin 36 carried on a collar 38 movable upwardly until it engages a side rail tube 40 which functions as a stop and is connected to the post 30. Section 20 includes a circular-in-cross section post 41 having a vertically disposed and downwardly extending pin 42 welded at 44 to the post 41. The post 41 includes a lower offset portion 46 adapted to be received in the sleeve 32 on the post 30 of the adjacent interconnected section 14. Post 41 also includes a lower sleeve 50 positioned for registering alignment with sleeve 34 and pin 36. Sections 14 and 20 are interconnected by section 20 being raised relative to section 14 and pin portion 46 being dropped into sleeve 32. To raise section 20, the lower ends of the sections must be laterally displaced so that relative vertical movement may occur between sleeves 34 and 50 to allow pin portion 46 to enter sleeve 32. Next, the sections are allowed to move back into vertical alignment as section 20 is lowered relative to section 14, as seen in FIG. 6. Pin 36 is dropped through sleeve 50, completing the pivotal locking engagement between sections 14 and 20. Disengagement of the sections is accomplished by lifting the pin 36 to the position of FIG. 5 and then laterally disaligning the lower ends of the sections, followed by lifting section 20 upwardly, thereby removing pin portion 46 from sleeve 32.

An alternate hay feeder enclosure is illustrated in FIGS. 7 and 8 for hay bales and is referred to generally by the reference numeral 60, and is seen to include four arcuate sections 62 pivotally interconnected, as illustrated in FIGS. 5 and 6. A circular hay bale is provided in the circular enclosure 60. As the bale is consumed by animals feeding through the openings in sections 62, the cattle will push the sections toward each other until finally the enclosure assumes the position shown in FIG. 8, forming two pillow-shaped enclosures 66. The midsections of the sections 62 are spaced apart as seen in FIG. 8 due to the arcuate shape, thereby giving the pair of enclosures 66 standing stability and providing resistance to being knocked over by the feeding cattle. Further, the opposite ends of the pillow-shaped enclosures abut each other to rigidify the interconnected enclosures 66. It is appreciated that a four-section square or rectangular enclosure would totally collapse and fall down upon the section walls being moved toward each other to a position corresponding to that illustrated in FIG. 8 for the arcuate section 60.

Thus, in operation, both of the enclosures 10 and 60 may be filled with appropriate size stack of hay 12 or bale 64, and as animals feed through the openings in the enclosure side walls, the sections will be pushed towards each other until finally the enclosures are collapsed to the positions of FIGS. 4 and 8 where, as seen in FIG. 4, two triangular-shaped enclosures 10B are formed; and in FIG. 8, two pillow-shaped enclosures 66 result. In either of the enclosures in FIGS. 4 or 8, the cattle can reach the hay in the very center of the enclosures while the enclosures retain their standing stability due to the fact that the opposite side sections of the enclosures are in spaced-apart relationship.

FIGS. 9-17 disclose a horse hay feeding enclosure having four sections 100 including three spaced apart inverted U-shaped tubular spacer members 102 forming horse head feeding stations 104 therebetween which are completely open at the top 106 such that, as seen in FIG. 14, the horse 108 can raise its head 109 upwardly and turn it to the side over one of the spacers 102 without causing injury to the horse.

A pair of tubular spaced apart horizontal members 110 and 112 interconnect the legs 114 and 116 of the spaced apart tube with the upper tubular member 110 being received in recession legs 114 and 116 and the bottom ends of the legs being flattened on both sides and welded to the top center of the bottom horizontal member 112. Vertically disposed bars 118 extend between the legs 114 and 116 and are connected to the horizontal member 110 to keep the horse's head from between the legs 114 and 116. The space between the legs 114 and 116 and the horizontal members 110 and 112 is completely open to allow the horse's legs to freely move about without being caught. A round bale 130 is shown in the circular enclosure 132 formed by four arcuate sections 100.

In FIG. 11 the horse hay feeder section 100 is one of four sections which have been moved into a rectangular shape by horses pushing on it to reach the hay 130. As the hay bale 130 is eaten down the sections 100 are pushed inwardly further towards each other to the dash-line position whereupon the ends 122 abut against each other allowing oppositely disposed arcuate sections to form two upstanding hay feeding enclosures 124. The remaining hay in the enclosures 124 is represented in dash lines at 126.

In FIG. 16 a pair of wall sections 134 have a hay feeder section 100 extending therebetween to form an enclosure for hay 136.

In FIG. 15 the spacer member 102A is smoothly rounded as shown in FIGS. 9 and 14 and includes three straight portions 138, 140 and 142 forming the inverted U-shape which functions in a similar fashion to prevent injury to the horse's neck as the horse raises its head over the spacer 102A. The connection between adjacent sections 100 shown in FIGS. 12 and 13 is similar to that of FIGS. 5 and 6 and includes common reference numerals where structure is similar. In FIG. 9 a stop 144 is provided for engagement with the pin sleeve 32 to maintain end tubes 146 and 148 in the desired spaced apart relationship as shown.

FIG. 17 illustrates the relationship of the adjacent ends of sections 100 when the right-hand section is being raised to put the pin 46 into the sleeve 32. It is seen that the lower left-hand corner of the right-hand section overlaps the left-hand section and thus the lower left-hand corner of the right-hand section must be displaced laterally if one person is to make the connection between the adjacent sections. One person cannot raise both ends of the right-hand section as would otherwise be required to maintain the parallel relationship between adjacent ends to be connected. After the pin 46 is received in the sleeve 32 and the right-hand section is lowered to the ground, the parallel vertical relationship is restored and right-hand section 100 is moved laterally back into alignment with the left-hand section with the sleeves 34 and 50 being brought into registry such that the pin 36 may be dropped therethrough as seen in FIG. 13. Thus the connecting and disconnecting of adjacent sections 100 is a one-man operation due to the unique upper and lower pin and sleeve arrangement provided.

I claim:

1. An enclosure comprising, a plurality of pivotally interconnected, detachable sections, a pair of vertically spaced apart hinges interconnecting adjacent sections, one of said hinges including a rigid vertically non-movable downwardly extending pin secured at its upper end to one of said sections and having a lower free end, and a vertically disposed sleeve on the adjacent section to receive the free end of said pin;

the other of said hinges including vertically disposed and aligned sleeves with the sleeve on one section being below the sleeve on the other section, and a vertically movable pin received in both of said aligned sleeves; and said sleeves of said other hinge functioning as cooperating stop means to limit relative vertical movement when in a common vertical plane with said sections interconnected and to allow relative vertical movement when said sections are displaced laterally relative to each other, whereby said one section having said downwardly extending pin may be raised relative to said other section to allow said downwardly extending pin to enter said sleeve of said one hinge and then be lowered and moved into vertical alignment with said other section such that said movable pin of said other hinge may be lowered through said sleeve on said other section and into said sleeve on said one section to complete the pivotal locking engagement between adjacent sections.

2. The structure of claim 1 and a movable pin stop means is positioned above said sleeve on said other hinge of said other section a sufficient distance to allow said movable pin to be disengaged from said sleeve on said one section but not so far as to allow said movable pin to move upwardly out of said sleeve on the other section.

* * * * *